Dec. 22, 1925.
J. SCHUMACHER
DELIVERY APPARATUS
Filed Oct. 25, 1924
1,566,701
4 Sheets-Sheet 1
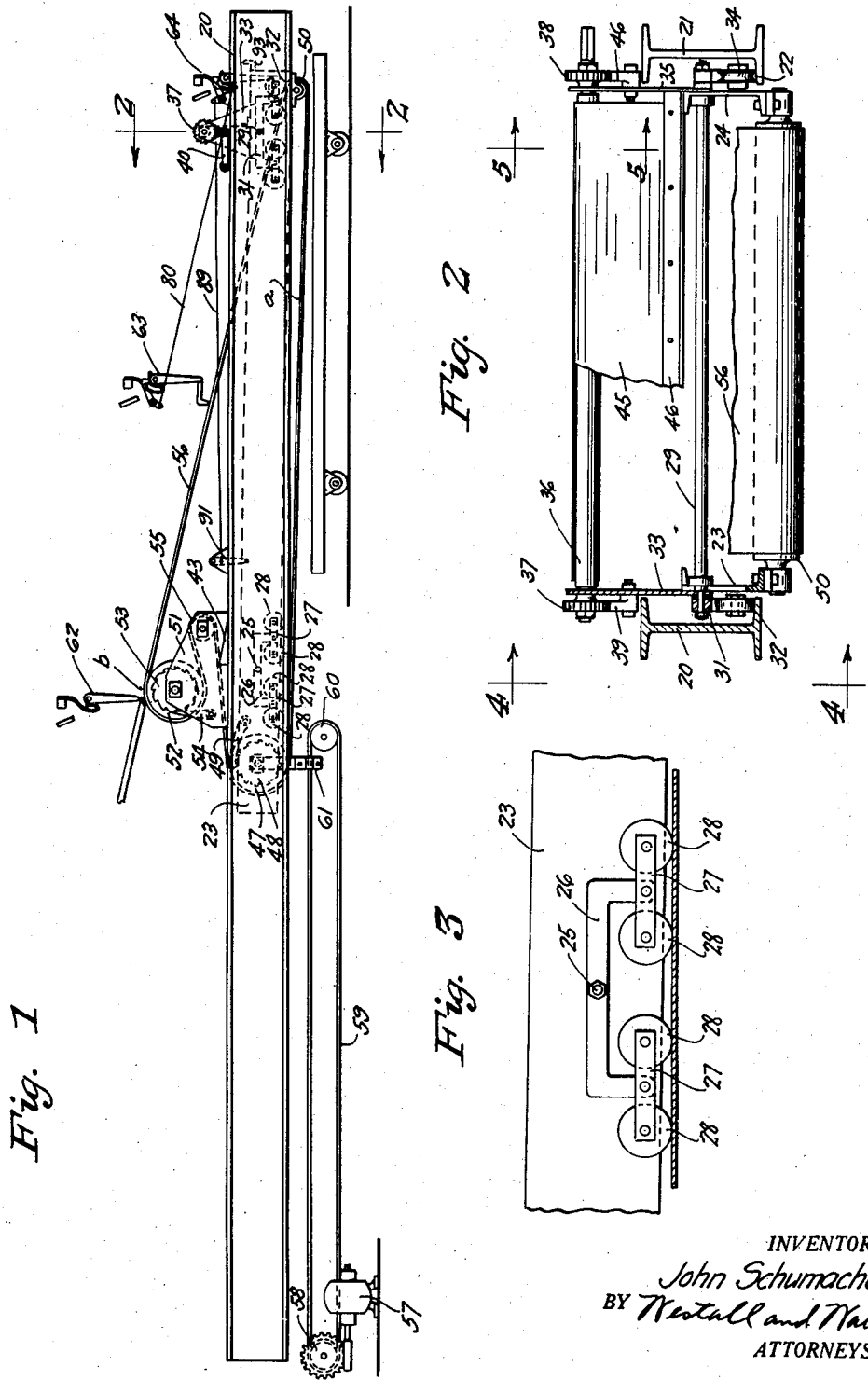
INVENTOR.
John Schumacher
BY Westall and Wallace
ATTORNEYS.

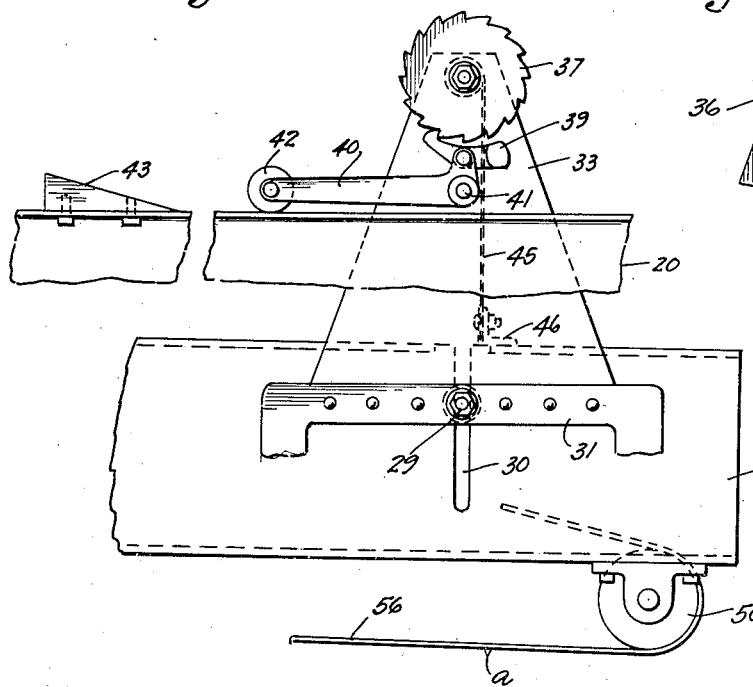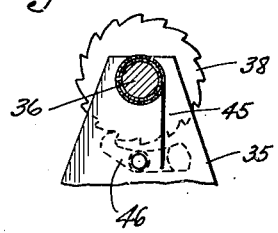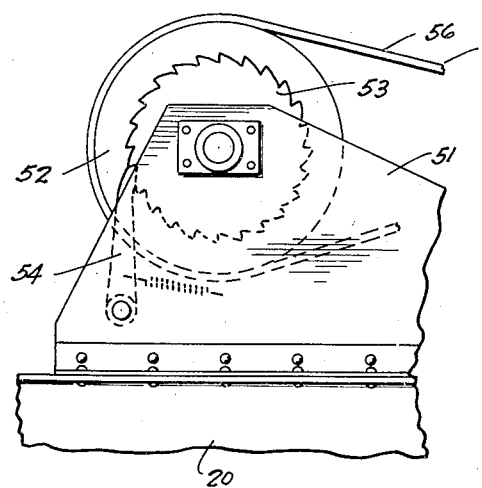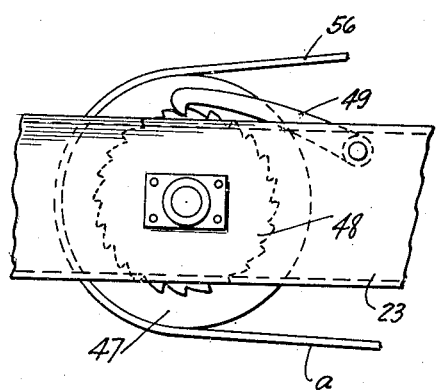

Dec. 22, 1925.

J. SCHUMACHER 1,566,701

DELIVERY APPARATUS

Filed Oct. 25, 1924  4 Sheets-Sheet 4

INVENTOR.
John Schumacher
BY Westall and Wallace
ATTORNEYS.

Patented Dec. 22, 1925.

1,566,701

UNITED STATES PATENT OFFICE.

JOHN SCHUMACHER, OF LOS ANGELES, CALIFORNIA.

DELIVERY APPARATUS.

Application filed October 25, 1924. Serial No. 745,780.

*To all whom it may concern:*

Be it known that I, JOHN SCHUMACHER, a citizen of the United States, and resident of Los Angeles, in the county of Los Angeles, State of California, have invented new and useful Improvements in a Delivery Apparatus, of which the following is a specification.

This invention relates to a device for depositing sheets, slabs, or like articles upon a receiver, and, more particularly to a device which may be used to deposit the articles in a stack. The invention as disclosed herein is adapted to be used in combination with a conveyor from which it receives the sheets.

In the manufacture of certain products, such as plaster board, the board is formed and advanced by a conveyor in a soft flexible state and is then divided into lengths or slabs on the conveyor. It is now the practice to manually remove the slabs and pile the same in stacks upon trays. Due to the green state of the board and its weight, manual handling may result in deformation, requiring the slabs to eventually be trimmed and resulting in waste. It is the primary object of this invention to provide a machine which will advance slabs and deposit them in piles. In addition to the broader objects of this invention, there are certain details of structure whereby an efficient, positively operating structure is obtained.

Figure 10:
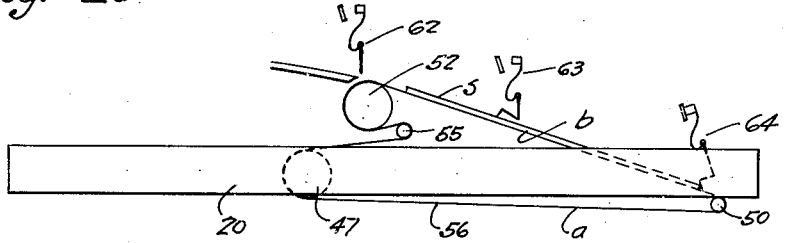
Figure 11:
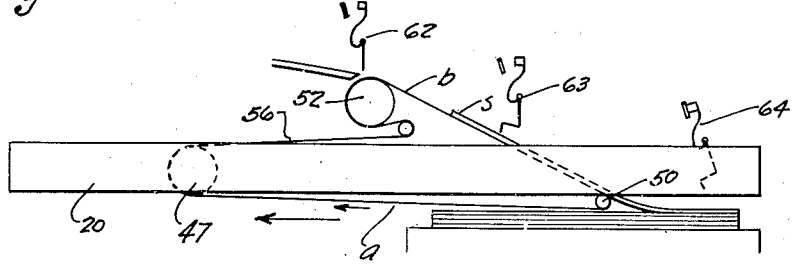
Figure 12:
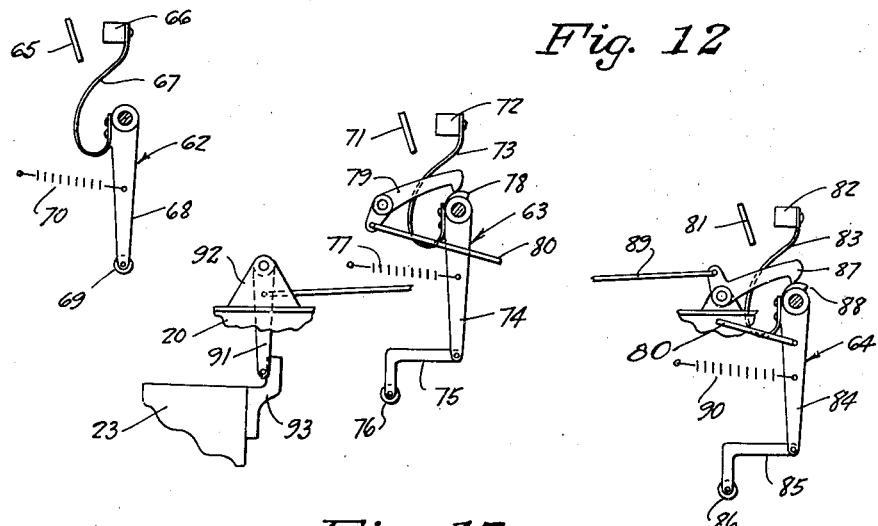
Figure 13:
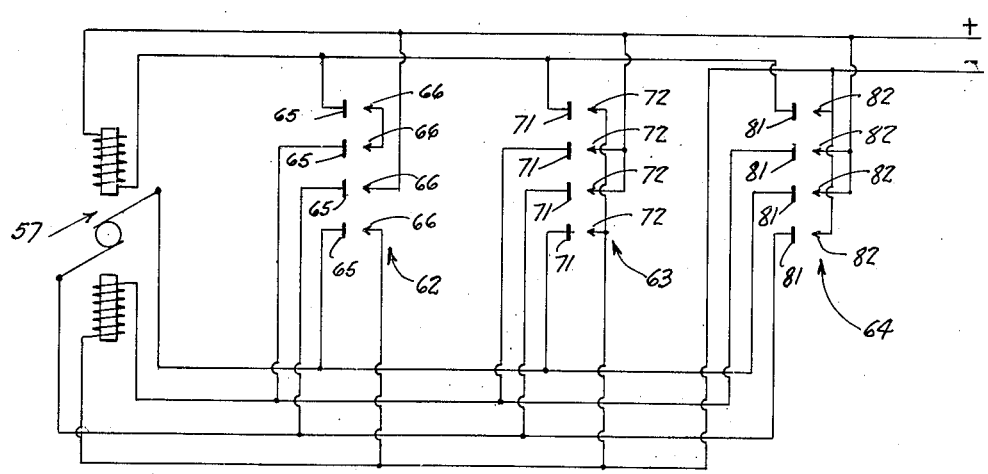

These objects together with other objects and corresponding accomplishments are obtained by means of the embodiment of my invention illustrated in the accompanying drawings, in which:

Fig. 1 is a side elevation of the complete machine; Fig. 2 is a view partly in section as seen along the line 2—2 of Fig. 1; Fig. 3 is an enlarged view of a fragment of the machine in side elevation showing one of the inner trucks; Fig. 4 is an enlarged view in elevation showing a fragment of the machine including details of structure for the lifting element, as seen on the line 4—4 of Fig. 2; F'g. 5 is a section as seen on the line 5—5 of Fig. 2; Fig. 6 is an enlarged side elevation showing a fragment of the machine with details of the belt control roller. Fig. 7 is a fragmentary view in elevation showing the inner roller and its ratchet; Figs. 8 to 11 inclusive are diagrammatic views illustrating the operation of the device; Fig. 12 shows the relation of the motor control switches; and Fig. 13 is a wiring diagram illustrating the control of the operating motor.

Referring more particularly to Figs. 1 to 7, inclusive, 20 and 21 are beams extending parallel to one another and serving as tracks to support a reciprocating carriage. These beams are preferably I-beams and on the lower inner flange of beam 21 is a half round rail 22 to prevent the carriage truck from riding off the flanges. Disposed between the beams 20 and 21 is a frame having side bars 23 and 24 forming the sides of a reciprocating carriage. These side bars may be suitably connected by cross pieces for bracing, and extending thereacross at the rear is a rod 25 having its projecting ends serving as stub shafts for trucks, one of these trucks being best shown in Fig. 3. There is a rocker bar 26 pivotally mounted upon the rod 25, the bar being preferably of channel form and carrying at its ends bars 27 pivoted at their centers and having at their ends wheels 28. At the forward end of the frame is a cross rod or shaft 29. The cross rod is slidably mounted in vertical slots 30 in the side bars 23 and 24, see Fig. 4. Pivotally mounted upon one end of the shaft 29 beyond the side bar is a rocker 31 having wheels 32 for riding upon the flanges of the beam 20. Secured to the rocker 31 and upstanding therefrom is a plate 33. Mounted upon the shaft 29 at the opposite side of the frame and adjacent bar 24 is a truck similar to the one just described, but provided with grooved wheels 34 to ride upon the rail 22. Secured to the truck and upstanding therefrom is a plate 35 similar to plate 33. Journalled in plates 33 and 35 is a roller 36 having at the ends thereof ratchet wheels 37 and 38. Mounted to engage the ratchet wheel 37 is a pawl 39 for advancing the latter. An operating lever 40 is pivotally mounted upon plate 33 as indicated by 41 and has pivotally secured to an arm thereof the pawl 39. At the free end of the arm 40 is a roller 42 arranged to ride upon an incline or ramp 43 mounted upon the inner end of beam 20. Thus, when the carriage moves inwardly, adjacent the inner end of its travel, roller 42 rides upon ramp 43, thereby swinging lever 40 and causing pawl 39 to advance ratchet wheel 37. This causes roller 36 to be turned. Secured to and wrapped around the roller 36 is a flexible strip 44. The other end of this strip is secured to a bar 45 mounted upon the top of side bars 23 and 24. Thus by turning the roller 36 so as to wind the strip 44 thereon, the frame will be raised. The carriage is such that the frame may be reciprocated forwardly and backwardly upon the supporting beams 20 and 21. A pawl 46 engages wheel 38 and prevents retrograde movement of the latter and the roller 36. Journalled between the side bars of the frame adjacent the rear is a roller 47, a ratchet wheel 48 being secured thereto and cooperating with a pawl 49 whereby rotation of the roller is only permitted in one direction. Journalled between the side bars 23 and 24 of the frame at the forward end is a roller 50. Mounted upon the supporting beam 20 adjacent the center thereof is a plate 51, a similar plate being mounted opposite thereto upon supporting beam 21. Journalled between the plates is a roller 52. Roller 52 has a ratchet 53 secured thereto cooperating with a pawl 54 which permits rotation only in one direction. Also journalled between the plates is a roller 55. A conveyor belt 56 is passed around rollers 47, 50, 52, and 55, as shown in Fig. 1. The operation of the conveyor belt is best shown in Figs. 8 to 11, inclusive.

Figure 8:
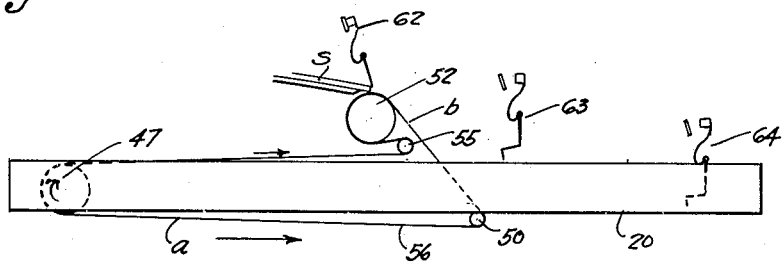
Figure 9:
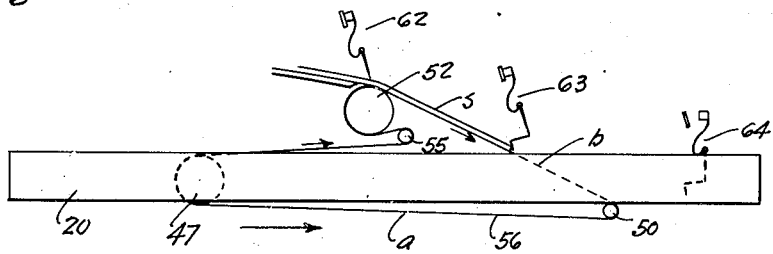

As the carriage reciprocates back and forth upon the supporting beams, rollers 47 and 50 are moved therewith backwardly and forwardly. However, rollers 52 and 55 are not moved therewith. Assume that the frame is in the position shown in Fig. 8. Upon the frame being moved outwardly, the belt portion indicated by a will remain stationary upon the rollers, 47 and 50, since the tendency would be to move the belt from the roller 50 toward the roller 47, but roller 47 cannot rotate in a direction such as to permit movement of the belt. The belt rides around rollers 52 and 55, the ratchets and pawls permitting this movement. The section of belt marked b advances with respect to the roller 52. Successive positions of the belt are shown in Figs. 8, 9, and 10. Upon return inwardly of the carriage, there is a tendency of the belt to move over the rollers 52 and 55 in a reverse direction. However. the pawl 54 and ratchet wheel 53 prevents retrograde movement of the roller, and the belt must adjust itself by riding about rollers 50 and 47. The movement is in the direction of the arrow shown in Fig. 11, and movement of the roller is permitted in a direction such that the belt may move. Structures of this broad character have been used with printing presses and are known in that art as extensible tape or conveyors.

I have provided an electric motor 57 for reciprocating the carriage. This motor is connected by suitable gearing to a drum 58, best shown in Fig. 1. Wrapped around the drum is a cable 59, which passes over an idler 60. Fastened to the cable is a bracket 61 secured to the carriage. Thus, by operating the motor in one direction and then in the reverse direction, the carriage will be reciprocated. Switches for reversing the motor at the ends of the travel of the carriage must be provided. It is also desirable to vary speeds of the motor causing the carriage to travel faster at the end of its delivery movement, and for this purpose other switches leading to the motor are provided. A sheet or slab of plaster board, indicated by S is delivered to the belt above the roller 52 and are carried by the section of belt b as the latter is projected outwardly, thereby being conveyed to a tray. The movement of the slabs controls the switches. Referring particularly to Figs. 8 to 11, inclusive, three switches are shown and are indicated by 62, 63, and 64. In Fig. 8, the slab is shown passing onto the belt over roller 52, the slab engaging a member of the switch 62 closing the latter and starting the carriage so that it reciprocates outwardly. As the slab reaches the position shown in Fig. 9, switch 63 is actuated to speed up the motor. When the slab reaches its outer position shown in Fig. 10, switch 64 is closed reversing the motor and causing the carriage to reciprocate inwardly. The structure of the switches is shown in Fig. 12. Switch 62 has stationary contacts 65 and a corresponding set of movable contacts 66 which are mounted upon spring fingers 67 secured to a pivoted arm 68. A roller 69 is secured to the end of arm 68, and a tension spring 70 tends to hold contacts 66 out of engagement with contacts 65. As a slab passes under arm 68, it engages the roller 69, swinging the arm 68 so as to engage contacts 66 with contacts 65 and maintain the contacts in engagement until the slab has passed from beneath the roller 69. Upon the slab passing from beneath roller 69, the spring 70 disengages the contact thereby opening the circuit at this point. The switch 63 has a set of sationary contacts 71 and a set of movable contacts 72 secured by springs 73 to a pivoted arm 74. A finger 75 is pivotally secured to arm 74 and has at the end thereof a roller 76 for engaging the slab. A tension spring 77 tends to hold the arm 74 so that contacts 71 and 72 are out of engagement with one another. A slab moving under the roller 76 will cause the arm 74 to be swung such as to close the switch at contacts 71 and 72. The projection of the belt causing a rise in the slab at its point of engagement with the roller 76 is taken care of by the finger 75. Upon the top of the arm 74 is a tooth 78 whereby to lock the arm in closed position. A rod 80 is provided for raising the pawl and releasing the arm 74. This rod is connected to the arm of switch 64 as is later described. Switch 64 comprises stationary contacts 81, and cooperating movable contacts 82 mounted upon spring fingers 83 secured to a pivoted arm 84. Pivotally secured to the end of arm 84 is a finger 85 having a roller 86 for engaging the slab. The operation of the switch is similar to that of switch 83. A pawl 87 is arranged to engage a tooth 88 on arm 84 so as to lock the latter in closed position. Rod 80 is connected to arm 84, so that when the switch 64 is operated it will swing pawl 79 and release arm 74 allowing the switch 63 to be opened by spring 77. Connected to pawl 87 is a rod 89 for releasing the pawl, and tension spring 90 connected to arm 84 tends to hold the switch 64 in open position. Rod 89 is connected to a lever 91. Lever 91 is pivotally mounted upon a bracket 92 secured to the supporting beam 20. Mounted upon the side bar 23 of the carriage at the outer end thereof is a finger 93 upstanding therefrom and arranged to engage the end of lever 91.

Following the position of the carriage and other parts successively in Figs. 8, 9, 10, and 11, a slab s is first delivered to the belt 56, closing switch 62 by engaging its arm. Switches 63 and 64 are open. The motor starts to operate and moves the carriage outwardly to deposit the slab. Movement of the carriage advances the slab with the projection of the section b of the belt, until the slab reaches the finger of switch 63. Movement of the slab beneath the finger causes the switch to immediately be closed resulting in the operating motor speeding up. This causes the carriage to move faster. Switch 63 is locked in position by pawl 79. As shown in Fig. 10, the slab passes beneath the finger of switch 64 closing the latter. Closure of switch 64 causes a pull upon rod 80 and a movement of pawl 79 to release the arm 74 of switch 63 and thereby to permit the spring 77 to open the switch. At the same time switch 64 is closed, thereby reversing the motor and is locked in closed position by pawl 87 engaging tooth 88. The carriage is then started on its return, the section b of the belt unrolling from beneath the slab which is deposited upon the tray. Upon the carriage reaching the inner end of its travel, finger 93 engages arm 91, swinging the latter and through rod 89 causing pawl 87 to be released from tooth 88, thereby releasing the arm 89 and permitting spring 90 to open switch 64. All of the switches are now open and ready for operation by the next slab of material.

In Fig. 13 a wiring diagram is shown of a motor having two sets of windings in the field for speed variation. These are connected to suitable contacts on the switches. The armature of the motor is connected to suitable contacts so that it is reversed by switches 62 and 64, current passing through the armature in the same direction when 62 is closed as when switch 63 is closed. The details of the electrical connections form no part of my invention, and it is not necessary to describe the same.

In the operation of the device the slabs are delivered by a conveyor or other suitable delivery mechanism to the belt upon the carriage as shown in Fig. 8. As the slab passes under the switch 62 it closes the latter and starts the motor. This causes the carriage to be moved outwardly. The belt section b is projected and advanced, carrying with it the slabs which pass under the switch 63 operating the latter as shown in Fig. 9. This causes the motor to speed up and the slab is carried more rapidly by the belt outwardly until it engages and passes under the switch 64. At this point, the switch 64 is closed and the switch 63 is released. The slab will have passed from under switch 62 and the latter will have opened. The motor is now reversed. The end of the slab will be deposited upon the tray as shown in Fig. 11. Return of the carriage will unroll the belt section b from beneath the slab depositing the latter in its stack.

The carriage is started in operation with the member 45 unwrapped from the roller 36 and therefore in its lowest position, the carriage thereby being in its lowest position. Each time that the carriage returns to its inner position, arm 40 rides upon the ramp 43, thereby advancing the ratchet 37 and wrapping the strip 45 about the latter. Each movement causes a slight elevation of the end of the carriage sufficient to clear the slab last deposited. After the stack has been completed, the pawls 39 and 46 must be released to lower the carriage.

What I claim is:

1. In a device of the character described, a reciprocable carriage having an extensible endless conveyor belt mounted thereon, means to reciprocate said carriage, and control means actuable by the travel of goods on said belt to control the reciprocation of said carriage.

2. In a device of the character described, a reciprocable carriage having a conveyor belt mounted thereon, one way means to prevent travel of said belt upon said carriage upon advance of the latter, means external of said carriage and over which said belt is passed to hold said belt stationary and cause it to travel upon said carriage on the retraction of the latter and permit movement thereover upon advance of said carriage, means to reciprocate said carriage, and control means actuable by the travel of goods on said conveyor to control the reciprocation of said carriage.

3. In a device of the character described, a reciprocable carriage having a conveyor belt mounted thereon to travel longitudinally thereof, a stationary roller mounted above said carriage and over which said belt is passed, one-way means to prevent travel of said belt upon said carriage upon advance of the latter, and one-way means to hold said belt so as to prevent its travel over said stationary roller upon retraction of said carriage, means to reciprocate said carriage, and control means actuable by the travel of goods on said conveyor to control the reciprocation of said carriage.

4. In a device of the character described, a supporting frame, a reciprocable carriage mounted to travel longitudinally, carriage rollers mounted on said carriage at the front and rear, a conveyor belt passed over said rollers, one-way means to prevent travel of said belt upon said carriage upon advance of the latter, one way means to hold said belt stationary and cause it to travel upon said carriage on the retraction of the latter, and means to progressively raise the front carriage roller.

5. In a device of the character described, a supporting frame, a reciprocable carriage mounted thereon to travel longitudinally thereof, carriage rollers mounted on said carriage at the front and rear, a conveyor belt passed over said rollers, a stationary roller mounted above said carriage and over which said belt is passed, one-way means to prevent travel of said belt upon said carriage upon advance of the latter, one-way means to hold said belt so as to prevent its travel over said stationary roller upon retraction of said carriage, and means to progressively raise the front carriage roller.

6. In a device of the character described, a supporting frame, a reciprocable carriage mounted thereon to travel longitudinally thereof, carriage rollers mounted on said carriage at the front and rear, a stationary roller mounted above said carriage with the conveyor section of the belt passed around the same, one-way means to prevent travel of said belt upon said carriage when the latter is advanced, one-way means to prevent the travel of said belt over said stationary roller upon retraction of said carriage, whereby the belt is advanced with respect to said stationary roller upon advancement of said carriage, and means to progressively raise the front carriage roller.

7. In a device of the character described, a supporting frame, a reciprocable carriage having carriage rollers at the front and rear mounted to travel on said frame, a conveyor belt passed about said rollers, a stationary roller mounted above said carriage with the conveyor belt passed around the same, pawl and ratchet means connected to the rear carriage roller to prevent travel of said belt upon said carriage when the latter is advanced, pawl and ratchet means connected to said stationary roller to prevent travel of said belt about the latter upon retraction of said carriage, whereby the belt is advanced with respect to said stationary roller upon advance of said carriage, and means to progressively raise the front carriage roller.

8. In a device of the character described, a supporting frame, a reciprocable carriage having carriage rollers at the front and rear mounted to travel on said frame, a conveyor belt passed about said rollers, a stationary roller mounted above said carriage with the conveyor belt passed around the same, an idler roller mounted adjacent said stationary roller to increase the bight thereof, pawl and ratchet means connected to said rear carriage roller to prevent travel of said belt upon said carriage when the latter is advanced, pawl and ratchet means connected to said stationary roller to prevent travel of said belt about the latter upon retraction of said carriage, whereby the belt is advanced with respect to said stationary roller upon advance of said carriage, and means to progressively raise said front roller.

9. In a device of the character described, a reciprocable carriage having a conveyor belt mounted thereon, one-way means to prevent travel of said belt upon said carriage upon advance of the latter, one-way means to hold said belt stationary and cause it to travel upon said carriage on the retraction of the latter, a motor to reciprocate said carriage, and control means for said motor actuated by the travel of goods on said carriage.

10. In a device of the character described, a supporting frame, a reciprocable carriage, carriage rollers mounted on said carriage at the front and rear, a conveyor belt passed over said rollers, mounted thereon to travel longitudinally thereof, a stationary roller mounted above said carriage and over which said belt is passed, one-way means to prevent travel of said belt upon said carriage upon advance of the latter, and one-way means to hold said belt so as to prevent its travel over said stationary roller upon retraction of said carriage, and means operated by travel of said carriage to raise the front carriage roller.

In witness that I claim the foregoing I have hereunto subscribed my name this 13th day of October, 1924.

JOHN SCHUMACHER.